United States Patent [19]
Franklin

[11] Patent Number: 5,393,025
[45] Date of Patent: Feb. 28, 1995

[54] CABINET MOUNTING HARNESS

[76] Inventor: Harry C. Franklin, 1117 Hudspeth Ave., Simi Valley, Calif. 93065

[21] Appl. No.: 140,293

[22] Filed: Oct. 21, 1993

[51] Int. Cl.⁶ .............................................. A47H 1/10
[52] U.S. Cl. .................................... 248/317; 248/917
[58] Field of Search ............... 248/317, 339, 340, 341, 248/318, 323, 671, 917, 919; 294/74

[56] References Cited
U.S. PATENT DOCUMENTS

| | | | |
|---|---|---|---|
| 2,793,904 | 5/1957 | Gale | 294/74 |
| 3,466,080 | 9/1969 | Norton | 294/74 |
| 4,101,109 | 7/1978 | Edwards | 294/74 X |
| 4,520,979 | 6/1985 | McInnis | 248/317 X |
| 5,064,161 | 11/1991 | Anderson | 248/317 |
| 5,179,367 | 1/1993 | Shimizu | 248/317 X |
| 5,207,795 | 5/1993 | Sato et al. | 294/74 |

Primary Examiner—Ramon O. Ramirez
Attorney, Agent, or Firm—David O'Reilly

[57] ABSTRACT

A cabinet mounting harness comprised of a small T-shaped strap assembly and a T-shaped strap assembly. The large T-shaped strap assembly wraps around the sides and the rear of the cabinet and is joined to the small T-shaped strap assembly positioned on the top of a cabinet by heavy duty double side locking plastic buckles. The small T-shaped strap assembly is provided with a reinforced loop for hanging a cabinet mounted in the harness assembly on a rolled, threaded hook secured to a ceiling joist. The entire harness assembly is made of nonconductive material to prevent electric shock and allows a cabinet to be easily mounted and dismounted for repair or use at a different location. An optional feature includes sleeves on the large T-shaped strap assembly for mounting a VCR or similar device beneath a television with additional straps.

20 Claims, 3 Drawing Sheets

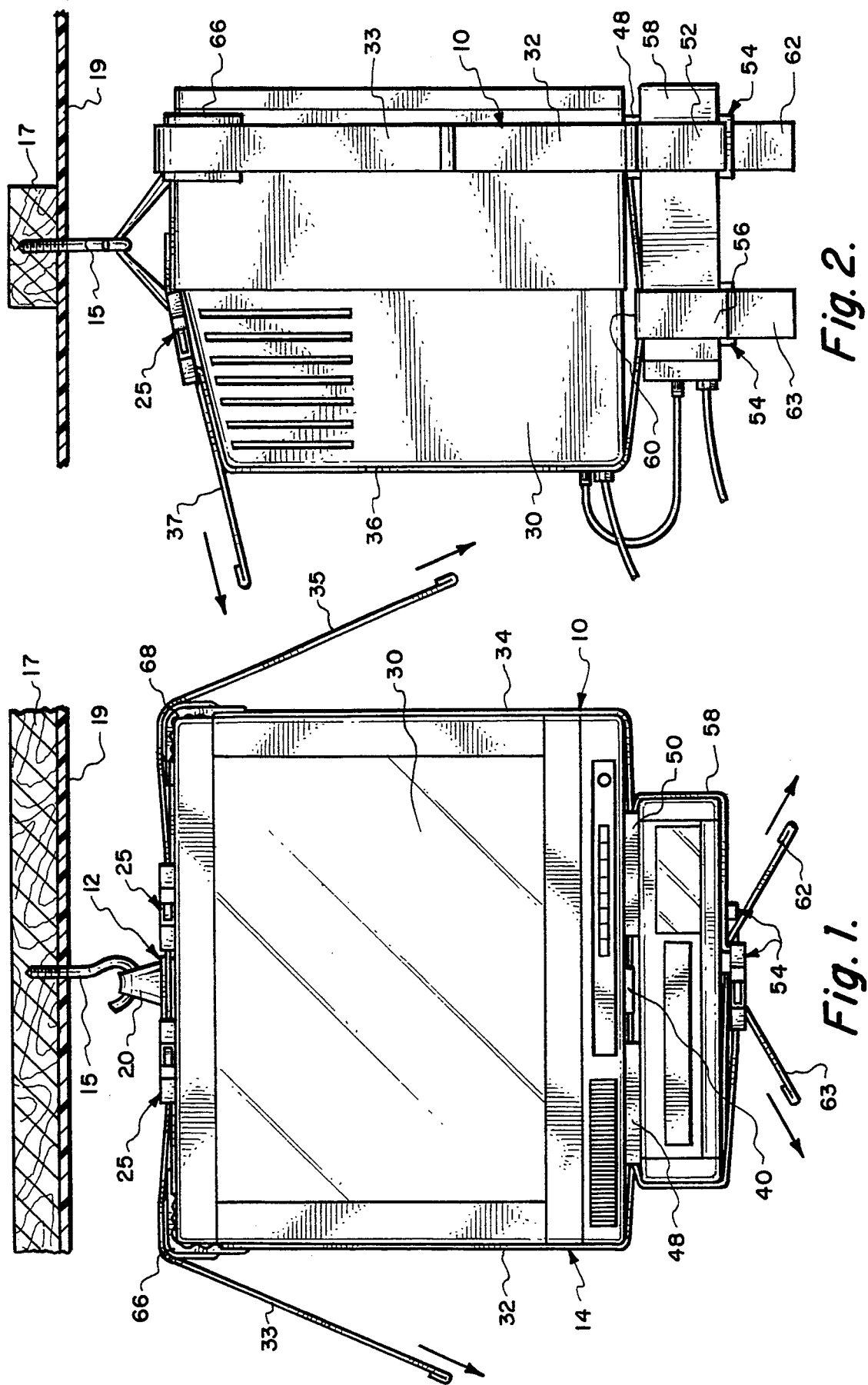

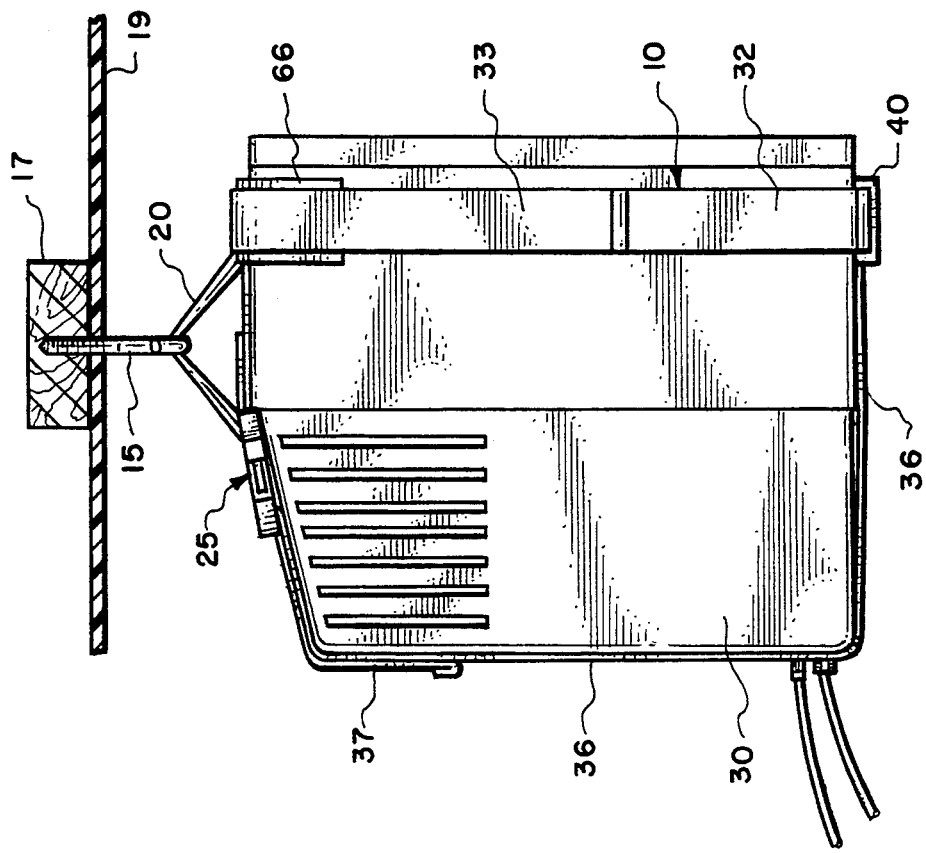
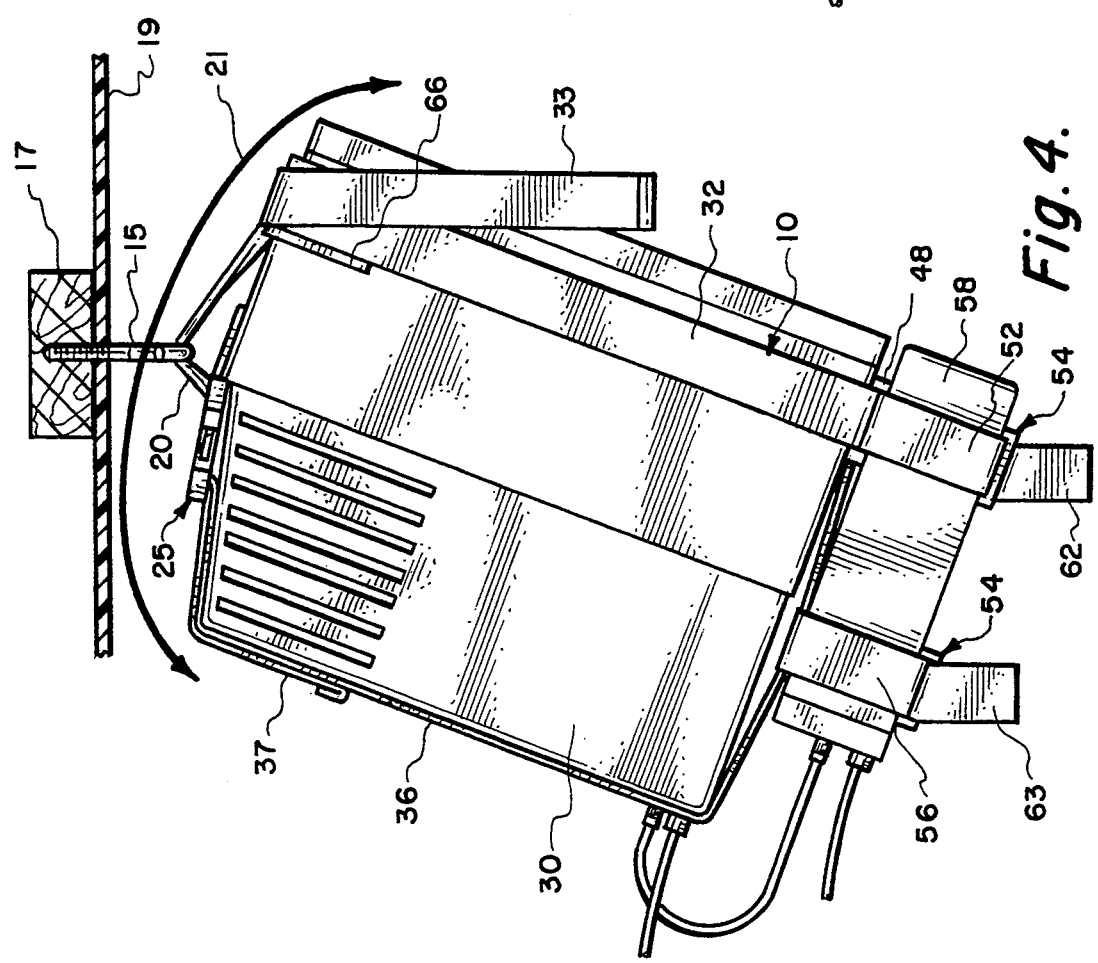

CABINET MOUNTING HARNESS

FIELD OF THE INVENTION

This invention relates to cabinet mounting devices and mounting platforms for supporting televisions, speaker enclosures, and the like; and more particularly, relates to a harness for mounting such cabinets.

BACKGROUND OF THE INVENTION

Numerous devices are available for mounting televisions and speaker cabinets on walls and ceilings. Some of these devices are used in hospitals, hotels, and residences; particularly where there are earthquakes.

The conventional method of mounting a television on a wall or ceiling uses a bracket assembly having metal arms and platforms similar to those used in hospitals and hotels. However, these types of devices can be very expensive. They require a substantial mechanical aptitude to install. Being made of metal, there is also the danger of electrical shock. Aesthetically, they are very unappealing. All of these factors make these models inconvenient to use by the average consumer.

Conventional metal arm and platform type mounting devices designed for residential use, are usually made of light weight metal and therefore, inherently flimsy. The arm sticking out perpendicular to the wall must be securely fastened to the wall, usually with a very large plate as this is the weak link with this type of device. Wall mounted metal platforms protrude into the room and the television may even have to be partially dismantled to secure it to the platform. In most cases, the television is supported from the bottom using the platform. In metal screws the platform are sometimes threaded into the bottom of the television cabinet and presents a substantial danger of electrical shock.

These are the same devices to suspend a television or like device from the top but they are also made of metal and use a platform to set the television on. Some secure the television to the platform with a strap. A disadvantage of this type of wall mounting unit is that once it is installed and the television is mounted, it is very difficult to remove the television for any other purpose. If one wishes to remove the television for repair or simply to move it to another location, is must be dismounted from the wall mount. The wall mount then remains on the wall. Thus the disadvantages of most of the devices now available are complicated, expensive and difficult to install and don't provide much flexibility in use.

It is therefore one object of the present invention to provide a cabinet mounting harness device that is simply and easy to install.

Yet another object of the present invention is to provide ceiling mounting harness device for cabinets such as televisions or the like to permit the television to be easily mounted and dismantled for repair or placement in another location.

Still another object of the present invention is to provide a cabinet mounting harness device for television cabinets and the like which is constructed entirely of non-conductive material to prevent the hazards of electrical shock.

Still another object of the present invention is to provide an suspension device in the form of a harness that wraps around a television cabinet or the like and provides a mounting support that can also be used as a carrying handle.

Still another object of the present invention is to provide a cabinet mounting harness device that allows adjustment of the position a television when it is mounted.

Yet another object of the present invention is to provide a cabinet mounting harness that can also support a VCR below a television cabinet.

BRIEF DESCRIPTION OF THE INVENTION

The purpose of the present invention is to provide a cabinet mounting harness device for televisions or the like that is easy to mount and that is very flexible in it use.

The present invention was conceived because it was discovered after some research that current availability of television suspension devices, meant to mount televisions on walls and ceilings for a better viewing position were all generally supported from below. This leads us to the fact that as such, they must be mounted to the wall or ceiling in a manner that they are at a direct right angle to the wall. This is clearly a weak point on the wall mounted platform type mounts. Due to the depth of a television or a similar device, a good length of arm protruding from the wall to support the platform for mounting the television is necessary. A few devices were found that support a television from above, but like other television suspension devices currently available, they also use special platforms for the television to sit on.

Also, any arm type wall mounts use bolts to secure the television to the platform, meaning the television must often be partially dismantled to attach it to the platform. Since the wall type mounted platforms are made of metal to support the weight from below, the risk of electrical shock is substantially increased. Some even use a metal frame to surround the television increasing the potential for damage to the television dramatically.

If an individual attempts to hold a heavy object away from their body at arm's length, fatigue quickly sets in. However, a person can hold a much heavier object for a much longer period of time if the object is held from the top and allowed to rest directly below the point of suspension. This particular phenomenon inspired conception of a television suspension device that supports a television or like device from above.

The present invention uses webbing or strap like material to securely hold a television or like device to mount it from a ceiling or wall. There are many flexible strapping materials that would be suitable for this type of device. One type of suitable strapping is the kind of nylon webbing used for seat belts in automobiles and airplanes. This type of material is so strong that the Federal Government uses it in the military. Often, this particular type of strapping material is also used in flatbed trucks to secure cargo.

This type of flexible strapping was used to build a secure harness from which a television or like device can be conveniently mounted on the ceiling or wall. The material is nonconductive and does not bolt to the television or use a platform to secure the television. It is very easy to install and very user-friendly. There is no need to dismantle the television in any way, and it is fully adjustable for almost all sizes of televisions.

The harness is comprised of strapping material having double side-locking plastic buckles for securing it around the television enclosure. A rolled thread hook is used to secure a television mounted in the harness to a ceiling joist. The harness is very strong, light, and secure. When attached to a television and hung on a threaded hook from a ceiling joist, the harness is aesthetically pleasing because it has very low visibility. A television mounted in the harness and supported from a ceiling hook has over 30° of tilt adjustment, and because it hangs from a single point of attachment, can be easily directed to point at any direction of a 360° circle simply by rotating the mounting hook.

The harness is comprised of a pair of T-shaped assemblies formed from flexible strap or webbing material. One assembly is a small T-shaped assembly having one-half of double side locking plastic buckles at each end of the T. This T lies on top of the television or enclosure and receives a mating double side locking plastic buckle mounted on a second large T-shaped assembly formed of webbing or strapping material that wraps around the side and rear of the television or cabinet. The harness thus straps securely to the television cabinet and the television is hung from a specially designed loop or handle attachment point on the small T-shaped assembly harness from the rolled thread hook mounted in a ceiling joist. This allows the television to be easily removed from the hook by taking the entire harness assembly with the television, leaving the hook in the ceiling. This permits the viewer to move the television about easily from one location to another. The loop atop of the small T-shaped assembly for mounting the television on the hook provides an easy carrying handle when the television is removed from the hook.

The primary purpose of the harness assembly is for hanging televisions from the ceiling in order to provide comfortable viewing for the viewer. The harness assembly has also proven that it can handle most cases where the need calls for a means of support from the top mounted position that still allows access from the front of the object being supported.

The harness assembly can be used to mount any type of cabinet or enclosure. For that reason, such items as computer monitors, stereo speakers, microwave ovens, etc. can easily be wall or ceiling mounted with the harness assembly.

Another feature of the harness is the ability to mount a second object beneath the main harness. This can be used to mount a VCR beneath a television, for example. To accomplish this, sleeves are mounted on the crosswise straps of the large T-shaped assembly that straps around the cabinet of the television providing an attachment point that allows a VCR to be mounted snug up beneath the television. A strap is threaded through the sleeves and wraps around the VCR, and is fastened with double side locked plastic buckles. A second strap fits through the rear portion of the harness and supports the rear of the VCR. It too has the same plastic buckles that are easy to install and cinch down tightly against the case on the VCR.

The above and other novel features of the invention will be more fully understood from the following detailed description and the accompanying drawings, in which:

BRIEF DESCRIPTION OF THE DRAWINGS

FIG. 1 is a front elevation of a television and a VCR mounted with the harness assembly, constructed constructed to the invention.

FIG. 2 is a side elevation of the television and mounting harness of FIG. 1.

FIG. 4 is a side elevation of the mounting harness supporting a television and VCR illustrating the tilt adjustment.

FIG. 5 is a side elevation illustrating a television mounted with the mounting harness without the VCR attached.

DETAILED DESCRIPTION OF THE INVENTION

Figure 3:
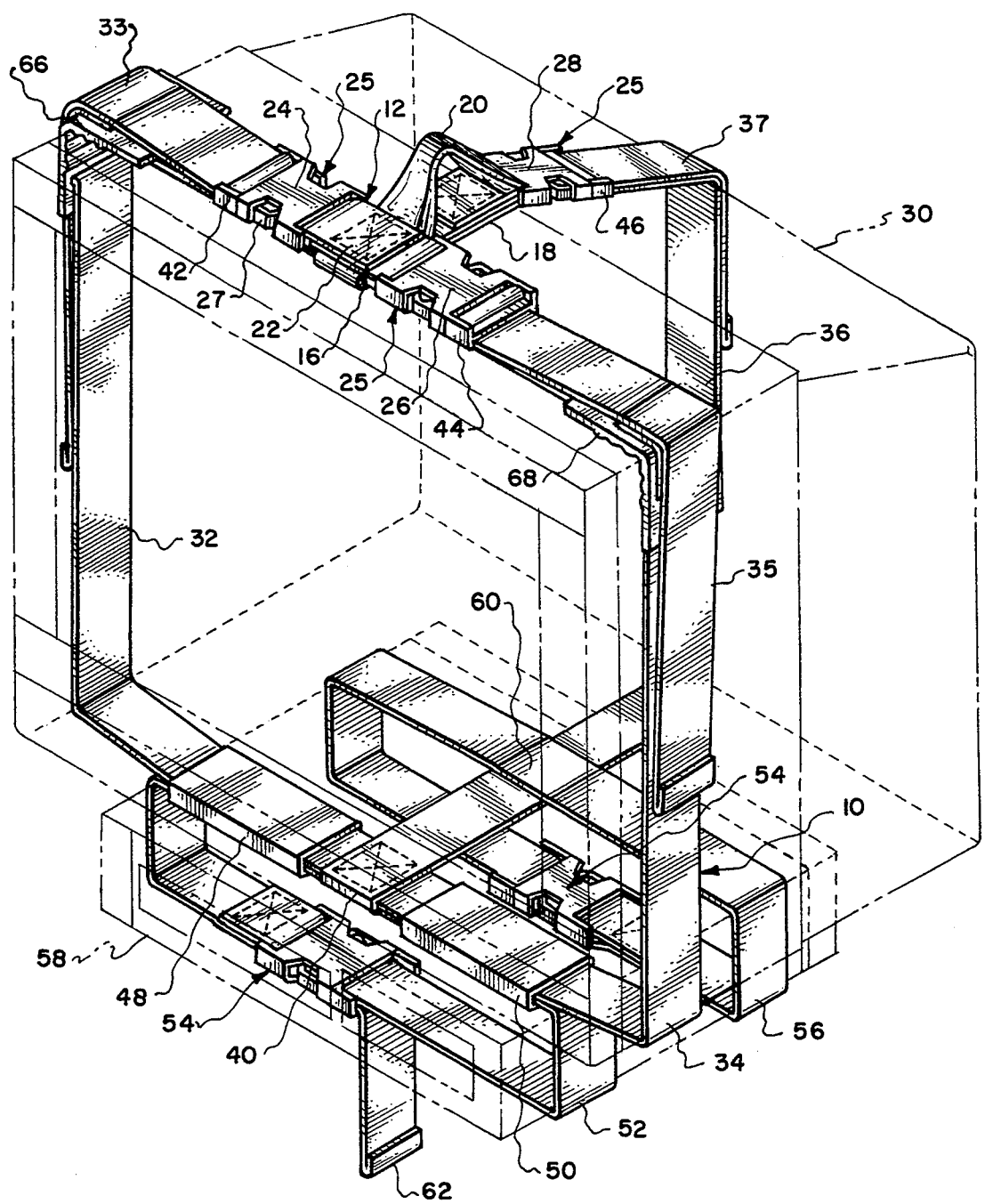
FIG. 3 is a perspective view of the mounting harness according to the invention with the television and VCR shown in phantom.

The television or cabinet mounting harness 10 is illustrated in FIG. 1 through 3. Cabinet support harness 10 is preferably comprised of two T-shaped assemblies 12 and 14.

The mounting harness 10 is shown generally in FIGS. 1 and 2. The mounting harness is comprised of a small tee shaped strap assembly 12 and a large tee shape strap assembly 14. Small tee shape strap assembly 12 is fastened to large tee shape assembly 14 preferably by double side locking buckles 25 that secure the large tee shape strap assembly 14 around a television cabinet 30. Small tee shaped strap assembly 12 is provided with a heavily reinforced loop 20 for mounting the harness assembly 10 on a hook 15 securely fastened to a ceiling joist 17. An optional and preferred feature is the addition of sleeves 48 and 50 that allow a VCR 58 to be mounted beneath television cabinet 30 as will be described in greater detail hereinafter.

The first tee shape assembly 12 is comprised of crosswise strap 16 and a perpendicular strap 18 for supporting a loop or handle 20. Crosswise strap 16 and perpendicular strap 18 are heavily sewn together at the crossing points 22 reinforced loop 20 is attached to perpendicular strap 18. Each end of the small T-shaped strap assembly 12 has one-half of a double side lock plastic buckle 24, 26, and 28 securely fastened to the ends. Small T-shaped strap assembly 12 is for supporting loop 20 for mounting the harness assembly and hook 15 with a television installed.

Small T-shaped strap assembly 12 is unique in that it easily fits or lies on top of cabinet 30 of a television cabinet or the like.

Large T-shaped assembly 14 is substantially larger than small T-shaped assembly 12 and has long crosswise arms 34 secured to a central perpendicular leg 36 at crossover or midpoint 40. Arms 32 and 34 should have sufficient length to wrap around televisions having a screen size of up to 27 inches. Larger televisions could be accommodated, but generally are too heavy for safely mounting onto walls or ceilings. Crosswise arms 32 and 34 and perpendicular leg 36 have the other half of double side locking plastic buckles 42, 44, and 46 that mate with the other half of double side lock plastic buckles sections 24, 26, and 28 on small T-shaped strap assembly 12. Preferably, buckles ends 42, 44 and 46 are the male components with buckle ends 24, 26, and 28 being the female end.

Double side lock plastic buckles 25 are preferably preferred fastener Model No. SR2 manufactured by ITN Nexus Company of Elk Grove, Ill. disclosed and described in U.S. Pat. Nos. 4,150,464 and 4,171,555 incorporated herein by reference. The advantage of these type of buckles is that they tend to become more secure as lateral forces are applied to the ends. They can be easily released by compressing the latches 27 inward toward each other.

As was stated previously, small T-shaped strap assembly 12 and large T-shaped strap assembly 14 are preferably constructed of a very strong nylon webbing material such as that used in automobile seat belts and the like. This type material can support weight that is many times the weight of any television or other type of cabinet being mounted with harness 10.

An optional and preferred feature of the invention is the inclusion of mounting straps that will allow a VCR or a similar device to be mounted beneath cabinet 30 of a television. To accomplish this, sleeves 48 and 50 are slidably mounted on crosswise arms 32 and 34 for securing a strap 52 having a double side locking plastic buckle 54. A second strap 56 provides support for the rear of a VCR 58 by fitting over or beneath perpendicular leg 36 of a large T-shaped assembly 14 at 60. To mount a VCR 58 beneath cabinet 30 of a television, strap 32 is threaded through sleeves 48 and 50 and strap 56 is slid over perpendicular leg 36. The buckles are then closed leaving the straps loose. A VCR 58 is then slipped tight by pulling into the loops formed by straps 52 and 56 which are then pulled tight by pulling on end 62 of strap 52. Strap 56 is tightened in a similar manner.

To mount a television cabinet 30 with a VCR 58, mounting harness 10 is first mounted on the television cabinet. This is accomplished by lying the large tee shaped strap assembly 14 on the floor or any flat surface and setting the television cabinet with the crossover point 40 near the front of the cabinet. Small T-shaped strap assembly 12 is then laid on top of television cabinet 30. Crosswise arms 32 and 34 are then wrapped around the sides of television cabinet 30 and male ends 42 and 44 inserted into female ends 24 and 26 of buckle 25 on small T-shaped strap assembly 12. Perpendicular leg 36 is then brought around the rear of television cabinet 30 and male end 46 of buckle 25 inserted in female end 28. Mounting harness 10 is then tightened by pulling on ends 33 and 35 on crosswise legs 32 and 34 (FIG. 1) until desired tightness around television cabinet 30 has been reached. The length of crosswise arms 32 and 34 allow for adjustment to many different size cabinets. Loose end 37 of perpendicular leg 36 is then pulled to tighten until the support harness 10 until it is very snug against television cabinet 30.

Since some television and other types of cabinets are angled slightly backwards, an optional but preferred feature is the addition of adjustable gripping strips 66 and 68 on crosswise straps 32 and 34. Gripping strips 66 and 68 are preferably positioned at the corners of television cabinet 30 before ends 33 and 35 are tightened. Gripping strips 66 and 68 having a gripping surface 69 and thus securely retain, crosswise arms 32 and 34 when perpendicular leg 37 is tightened. This prevents the harness from slipping during installation. Once installed, flexible mounting harness 10 will remain firmly in position.

Another optional and preferred feature is to make loop 20 sufficiently long to serve as a handle and also to allow some tilt adjustment of the television. Loop 20 is at least one and one half inches longer than perpendicular strap 18, and is preferably about six to eight inches longer when stretched.

The harness assembly 10 can be mounted on a television cabinet 30 with or without VCR 58 as shown in FIGS. 4 and 5. Further, the length and configuration of loop 20 is such that when it is mounted on hook 15, the vertical angle of the television cabinet can be tilted as much as 30° for comfortable viewing. This is accomplished by sliding the television forward as indicated by arrow 21 (FIG. 4) in loop 20. Hook 15 thus hangs from the rear of loop 21 with television cabinet 30 tilted downward to an angle of about 30°.

As shown in FIG. 5, television cabinet 30, without VCR 58, is first hung on hook 15 and mounted on joist 17 in ceiling 19. VCR 58 can be mounted beneath television cabinet 30 with additional straps 52 and 56 mounted as previously described. The unique design of the small T-shaped strap assembly 12 and large T-shaped assembly 14 with reinforced loop 20 causes mounting harness 10 to become tighter when television cabinet 30 is hung on hook 15. The respective straps 32, 34, 36, and small T-shaped strap assembly 12 with buckles 25 fastened, tends to become tighter with the consistent weight that is placed on the mounting harness assembly 10.

Another advantage of the invention is that all the parts of the unique harness assembly 10 are constructed of nonconductive material so no electrical shock hazard can result. Further, there are no special tools required for mounting the harness assembly onto television cabinet 30. All that is needed are tools to mount hook 15 in joist 17 of a ceiling 19. Further, rotational adjustment of television cabinet 30 may be accomplished by simply rotating hook 15 to the position desired. Thus, the system provides vertical and rotational adjustments for optimum viewing of a television screen while providing extremely strong and positive support of a television cabinet and a VCR mounted on the harness assembly.

Another unique advantage of the system is that if the television needs to be dismounted for repair or to moved to a different location loop 20 is simply lifted off hook 15 and now serves as a handle for carrying the television to the new location. The television now may be optionally used at the new location and then returned to the mounting by hanging loop 20 onto hook 15 if desired.

Thus there has been disclosed a unique cabinet mounting harness assembly that is strong and durable, prevents electric shock, and has other unique advantages. The system is simple and easy to install and provides strong positive support. It allows a television to be easily mounted and dismounted and adjusted for best viewing angles. It also provides an optional feature that allows a VCR or other device to be hung beneath the television or other cabinet being supported. Another advantage is that the hanging support allows tilt adjustment and can also serve as a handle for carrying the cabinet around for movement to a new location or mounting in another area.

This invention is not to be limited by the embodiment shown in the drawings and described in the description which is given by way of example and not of limitation, but only in accordance with the scope of the appended claims.

What is claimed is:

1. A cabinet mounting harness assembly for a television cabinet comprising;

first strap assembly having a plurality of ends constructed to be positioned on the top of said cabinet;

second strap assembly having a plurality of ends constructed to wrap around the sides of said cabinet;

buckle means on the respective ends of said first and second strap assemblies, said buckle means being mounted in said first and second strap means so that they may be joined and said second strap assembly tightened down securely around said cabinet;

loop means on said first strap assembly;

whereby a cabinet secured in said first and second strap assemblies may be hung by engaging said loop means with a mounting hook.

2. The cabinet mounting harness according to claim 1 in which said first strap assembly comprises a small T-shaped assembly having a buckle connector secured to each end.

3. The cabinet mounting harness according to claim 2 in which said second strap assembly comprises a large T-shaped strap assembly comprises of a pair of cross arms constructed to wrap around the sides of said cabinet, and a perpendicular leg constructed to wrap around the back of said cabinet, said large T-shaped strap assembly having a buckle connector constructed to mate with the buckle connectors on each free end of the small T-shaped strap assembly.

4. A cabinet mounting harness according to claim 1 in which said buckles are double side locking plastic buckles.

5. A cabinet mounting harness according to claim 4 in which said buckles are at least two inch wide double side locking plastic buckles.

6. A cabinet mounting harness according to claim 3 in which said buckles are at least two inch wide double side locking plastic buckles.

7. A cabinet mounting harness according to claim 6 in which said buckles are at least two inch double side locking plastic buckles.

8. A cabinet mounting harness according to claim 1 in which said first and second strap assemblies are constructed of a flexible non-conductive webbing material.

9. A cabinet mounting harness according to claim 8 in which said flexible non-conductive webbing material is a nylon webbing material.

10. A cabinet mounting harness according to claim 3 in which said first and second strap assemblies are constructed of a flexible non-conductive webbing material.

11. A cabinet mounting harness according to claim 10 in which said first and second strap assemblies are constructed of a flexible non-conductive webbing material.

12. The cabinet mounting harness according to claim 1 including auxiliary cabinet mounting means for mounting an auxiliary cabinet to the bottom of said cabinet mounting harness assembly.

13. The cabinet mounting harness according to claim 12 in which said auxiliary cabinet mounting means comprises; adjustable sleeve means mounted on straps of said second strap assembly means; a first strap wrapped around said auxiliary cabinet threaded through said sleeve means and secured with a buckle; a second strap wrapped around said auxiliary cabinet and passing beneath a strap of said second strap assembly wrap around the back of said cabinet; whereby a second auxiliary cabinet may be secured to hang below a cabinet mounted in said cabinet mounting harness assembly.

14. The cabinet mounting harness according to claim 1 in which the length of said loop on said first strap assembly is selected to allow tilt adjust of a television cabinet mounted in said cabinet mounting harness.

15. The cabinet mounting harness according to claim 14 in which said loop is in the range of six to eight inches long to allow a tilt adjustment of approximately 30°.

16. The cabinet mounting harness according to claim 13 in which the length of said loop is selected to allow tilt adjust of a television cabinet mounted in said cabinet mounting harness.

17. The cabinet mounting harness according to claim 16 in which the length of said loop is selected to allow tilt adjust of a television cabinet mounted in said cabinet mounting harness.

18. The cabinet mounting harness according to claim 16 in which said loop is at least one and one half inches longer than a perpendicular leg of said small T-shaped strap assembly.

19. The cabinet mounting harness according to claim 1 including gripping means mounted on said second strap assembly to hold said second strap assembly in place when wrapped around a television cabinet.

20. The cabinet mounting harness according to claim 19 in which gripping means comprises a pair of gripping strips mounted on straps of said second strap assembly, said gripping strips being mounted for adjustable positioning at the corners of a cabinet mounted in said cabinet harness assembly.

* * * * *